United States Patent
Moon et al.

(10) Patent No.: US 12,483,088 B2
(45) Date of Patent: Nov. 25, 2025

(54) ELECTRIC COMPRESSOR

(71) Applicant: Hanon Systems, Daejeon (KR)

(72) Inventors: Chi Myeong Moon, Daejeon (KR); Dong Oh Kim, Daejeon (KR); Raing Su Kim, Daejeon (KR); Young Min Kim, Daejeon (KR); Kyu Namkoong, Daejeon (KR); In Cheol Shin, Daejeon (KR); You Cheol Jeong, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 18/549,027

(22) PCT Filed: Sep. 19, 2022

(86) PCT No.: PCT/KR2022/013933
§ 371 (c)(1),
(2) Date: Sep. 5, 2023

(87) PCT Pub. No.: WO2023/068565
PCT Pub. Date: Apr. 27, 2023

(65) Prior Publication Data
US 2024/0305163 A1    Sep. 12, 2024

(30) Foreign Application Priority Data
Oct. 21, 2021  (KR) .......................... 10-2021-0141219

(51) Int. Cl.
*H02K 5/24*  (2006.01)
*F04B 35/04*  (2006.01)
(Continued)

(52) U.S. Cl.
CPC ............... *H02K 5/24* (2013.01); *F04B 35/04* (2013.01); *F04B 39/121* (2013.01); *H02K 5/22* (2013.01); *H02K 5/225* (2013.01)

(58) Field of Classification Search
CPC ......... F04B 39/121; F04B 35/04; H02K 5/24; H02K 5/22; H02K 5/225
See application file for complete search history.

(56) References Cited

U.S. PATENT DOCUMENTS 8,670,234 B2 *   3/2014   Nakano .................. H02K 11/33
                                                    361/708
9,784,261 B2 *  10/2017   Hagita ................ F04B 39/0027
(Continued)

FOREIGN PATENT DOCUMENTS

JP   2013177826 A   9/2013
JP   2013177827 A   9/2013
(Continued)

OTHER PUBLICATIONS

Machine Translation of KR 1020200101879 (Year: 2020).*

*Primary Examiner* — Christopher S Bobish
(74) *Attorney, Agent, or Firm* — Shumaker, Loop & Kendrick, LLP; James D. Miller (57) ABSTRACT

An electric compressor includes a casing; a compression mechanism for compressing a refrigerant inside the casing; a motor for providing power to the compression mechanism; and an inverter for controlling the motor, and the casing includes an inverter cover for sealing the inverter from an outside, the inverter cover includes a plate-shaped plate, and the plate includes a first plate portion and a second plate portion extending from the first plate portion and protruding toward an inside in which the inverter is embedded. Accordingly, it is possible to achieve increased rigidity of the inverter cover, reduced vibration and noise, and suppressed weight increase at the same time.

13 Claims, 7 Drawing Sheets

(51) Int. Cl.
*F04B 39/12* (2006.01)
*H02K 5/22* (2006.01)

(56) References Cited

U.S. PATENT DOCUMENTS

| | | | | |
|---|---|---|---|---|
| 9,806,567 | B2* | 10/2017 | Lee | F04D 29/325 |
| 9,948,165 | B2* | 4/2018 | Hattori | H02K 5/04 |
| 10,119,542 | B2* | 11/2018 | Kang | F01C 21/10 |
| 10,122,247 | B2* | 11/2018 | Hattori | H02M 7/003 |
| 10,253,763 | B2* | 4/2019 | Nakagami | F04C 23/008 |
| 2020/0347838 | A1* | 11/2020 | Lu | F04C 29/047 |
| 2020/0392958 | A1* | 12/2020 | Kim | F04C 29/0085 |
| 2021/0313864 | A1* | 10/2021 | Zhang | H02K 11/40 |
| 2022/0170461 | A1* | 6/2022 | Inaba | F04C 18/0215 |
| 2023/0151811 | A1* | 5/2023 | Braasch | H02K 7/14 |
| | | | | 417/410.4 |
| 2023/0155448 | A1* | 5/2023 | Ogasawara | H02K 11/33 |
| | | | | 310/51 |
| 2024/0322641 | A1* | 9/2024 | Lissner | H02K 5/225 |

FOREIGN PATENT DOCUMENTS

| | | | |
|---|---|---|---|
| JP | 2020159350 | A | 10/2020 |
| KR | 20200101879 | A | 8/2020 |
| KR | 20200137362 | A | 12/2020 |

\* cited by examiner

| CLASSIFICATION | INVERTER COVER ACCORDING TO ONE EMBODIMENT OF THE RELATED ART | INVERTER COVER ACCORDING TO ANOTHER EMBODIMENT OF THE RELATED ART | INVERTER COVER ACCORDING TO THE PRESENT DISCLOSURE |
|---|---|---|---|
| NATURAL FREQUENCY | 2390Hz | 2583Hz | 2589Hz |
| AMPLITUDE | 178.6 | 130.5 | 129.5 |
| WEIGHT | 333.5g | 362.2g | 336.8g |

ELECTRIC COMPRESSOR

CROSS REFERENCE TO RELATED PATENT APPLICATIONS

This is a U.S. national phase patent application of PCT/KR2022/013933 filed Sep. 19, 2022 which claims the benefit of and priority to Korea Patent Application No. 10-2021-0141219 filed on Oct. 21, 2021, the entire contents of each of which are incorporated herein by reference.

FIELD

The present disclosure relates to an electric compressor, and more particularly, to an electric compressor for compressing a refrigerant with a motor controlled by an inverter.

BACKGROUND

Generally, a compressor is an apparatus compressing a fluid such as a refrigerant gas and the like, and is applied to an air conditioning (A/C) system of a building, a vehicle and the like.

The compressor is classified into a reciprocating compressor that compresses a refrigerant according to which pistons reciprocate, and a rotary compressor that compresses a refrigerant while rotating. The reciprocating compressor includes a crank compressor that transmits a driving force from a drive source to a plurality of pistons using a crank, a swash plate compressor that transmits a driving force from a drive source to a shaft installed with a swash plate, and the like, according to the power transmission from the drive source. The rotary compressor includes a vane rotary compressor that utilizes a rotating rotary shaft and vane, and a scroll compressor that utilizes an orbiting scroll and a fixed scroll.

Depending on a driving method, the compressors may be classified into a mechanical compressor that uses an engine and an electric compressor that uses a motor.

Here, the electric compressor includes a casing, a compression mechanism for compressing a refrigerant inside the casing, a motor for providing power to the compression mechanism and an inverter for controlling the motor.

Figure 1:
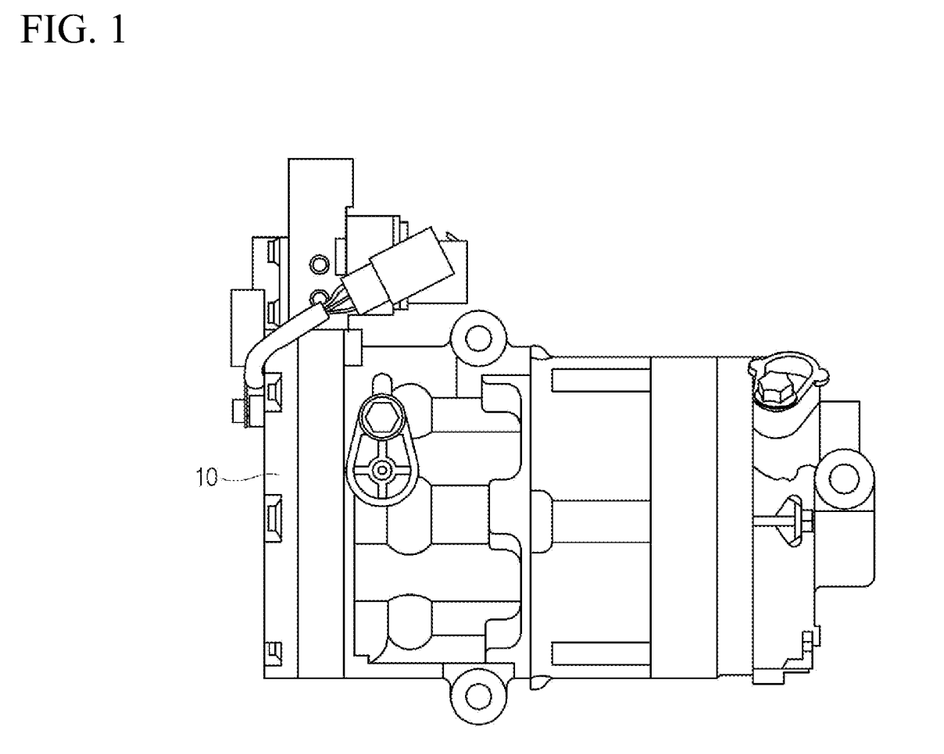
FIG. 1 is a perspective view illustrating an electric compressor of the related art.

Meanwhile, referring to FIG. 1, the casing includes a front housing having an opening into which the inverter is inserted, and an inverter cover 10 covering the opening of the front housing to protect the inverter from an impact, moisture, dust, and heat from an outside.

However, an electric compressor of the related art had a problem in that it could not achieve to increase rigidity of the inverter cover, reduce vibration, and noise, and suppress a weight increase at the same time.

Specifically, the inverter cover of the electric compressor according to the embodiment of the related art includes a plate covering an inverter, and a side plate extending from an outer circumference of the plate and fastened to a front housing, and since the plate is formed in a thin plate in general to reduce weight, the plate has low rigidity and is vulnerable to resonance caused by vibration of the electric compressor. Particularly, in the plate, a portion farther away from the side plate fastened to the front housing has lower rigidity and is more vulnerable to the resonance.

On the other hand, the electric compressor according to the embodiment of the related art further includes rib portions protruding from inner and outer surfaces of the plate to increase the rigidity of the plate, but the rigidity of the plate is not increased to a desired level due to lack of the rib portions.

Figure 7:
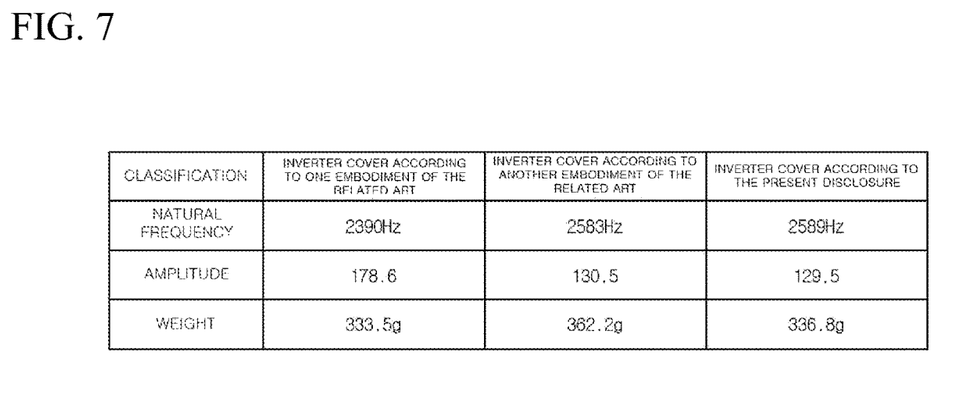
FIG. 7 is a comparison chart comparing the natural frequency, amplitude, and weight of each inverter cover.

In order to solve this problem, as seen in FIG. 7, when more rib portions are added like the inverter cover of an electric compressor according to another embodiment of the related art, the rigidity of the plate is further increased and a natural frequency of the inverter cover is increased and goes beyond a resonant frequency range, thereby the amplitude is reduced.

However, as more rib portions are added thereto, weight of the inverter cover increases as can be seen in FIG. 7, and such a weight increase leads to an increase of a manufacturing cost and reduction of fuel economy of a vehicle to which the electric compressor is mounted.

SUMMARY

Therefore, an object of the present disclosure is to provide an electric compressor capable of increasing rigidity of the inverter cover, reducing vibration and noise, and suppressing a weight increase at the same time.

One embodiment is an electric compressor, including: a casing; a compression mechanism for compressing a refrigerant inside the casing; a motor for providing power to the compression mechanism; and an inverter for controlling the motor, the casing may include an inverter cover for sealing the inverter from an outside, the inverter cover may include a plate-shaped plate, and the plate may include: a first plate portion; and a second plate portion extending from the first plate portion and protruding toward an inside in which the inverter is embedded.

The second plate portion may be formed to protrude more than the first plate portion on an inside and to be more recessed than the first plate portion on an outside.

The first plate portion may include: a first inner surface facing an inside; and a first outer surface forming a rear surface of the first inner surface and facing an outside, the second plate portion may include: second inner surface facing an inside; and a second outer surface forming a rear surface of the second inner surface and facing an outside, the second inner surface may be formed to be disposed on an inside with respect to the first inner surface, and the second outer surface may be formed to be disposed on an inside with respect to the first outer surface.

The plate may further include a first rib portion protruding from the first inner surface, and a thickness of the second plate portion may be formed smaller than a sum of a thickness of the first plate portion and a thickness of the first rib portion.

The second plate portion may be formed in an annular shape, and the first rib portion may extend across the second plate portion in a radial direction.

The first rib portion may consist of a plurality of first rib portions, the plurality of the first rib portions may be radially disposed in a circumferential direction of the second plate portion to meet each other in one region, and a center of the second plate portion may be located inside the one region.

The inverter cover may further include a fastening hole to which a fastening member is inserted, and a fastening rib portion surrounding the fastening hole, the fastening hole and the fastening rib portion may consist of a plurality of fastening holes and a plurality of fastening rib portions, respectively, and the plurality of first rib portions may extend from the plurality of fastening rib portions, respectively.

The plate may further include a second rib portion protruding from the first outer surface, and a thickness of the second plate portion may be formed smaller than a sum of a thickness of the first plate portion and a thickness of the second rib portion.

The second rib portion may include: a second annular rib portion formed on an inner side of the second plate portion.

The second rib portion may further include a second straight rib portion radially extending across the second plate portion to the second annular rib portion.

The second straight rib portion may consist of at least one straight rib portion, and at least part of the at least one second straight rib portion may be formed not to overlap the plurality of the first rib portions in an axial direction.

The at least one second straight rib portion may be formed in a different number from the plurality of the first rib portions.

A thickness of the second plate portion may be formed at an equal level to a thickness of the first plate portion.

The inverter cover may include a side plate formed on an outer circumference of the plate, and the second plate portion may be formed in a center of the plate.

The second plate portion may be formed at a position facing the motor in an axial direction.

Since an electric compressor according to the present disclosure includes: a casing; a compression mechanism for compressing a refrigerant inside the casing; a motor for providing power to the compression mechanism; and an inverter controlling the motor, the casing includes an inverter cover for sealing the inverter from an outside, the inverter cover includes a plate-shaped plate, and the plate includes a first plate portion and a second plate portion extending from the first plate portion and protruding toward an inside in which the inverter is embedded, the electric compressor according to the present disclosure may increase rigidity of the inverter cover, reduce vibration and noise, and suppress a weight increase at the same time.

DESCRIPTION OF AN EMBODIMENT

Hereinafter, an electric compressor according to the present disclosure will be described in detail with reference to the accompanying drawings.

Figure 2:
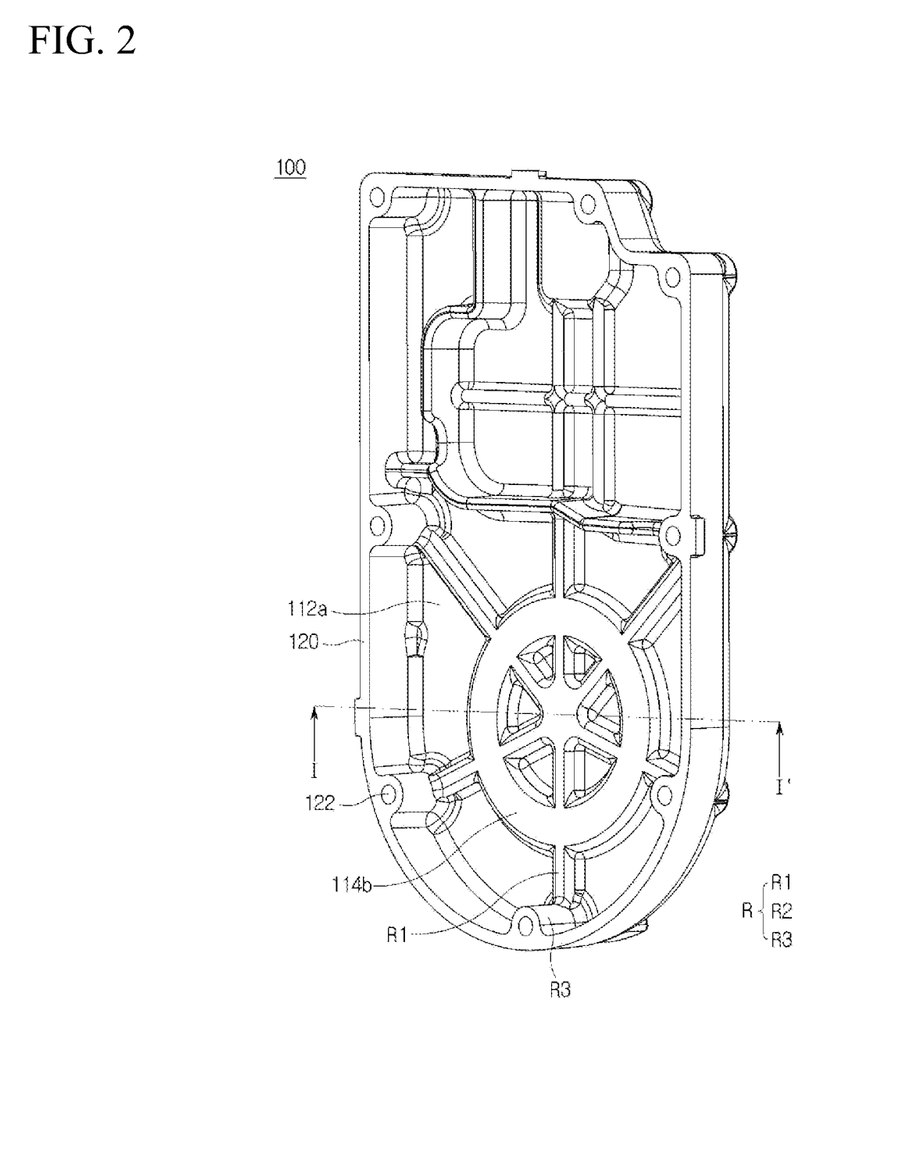
FIG. 2 is a perspective view illustrating an electric compressor according to an embodiment of the present disclosure.
Figure 3:
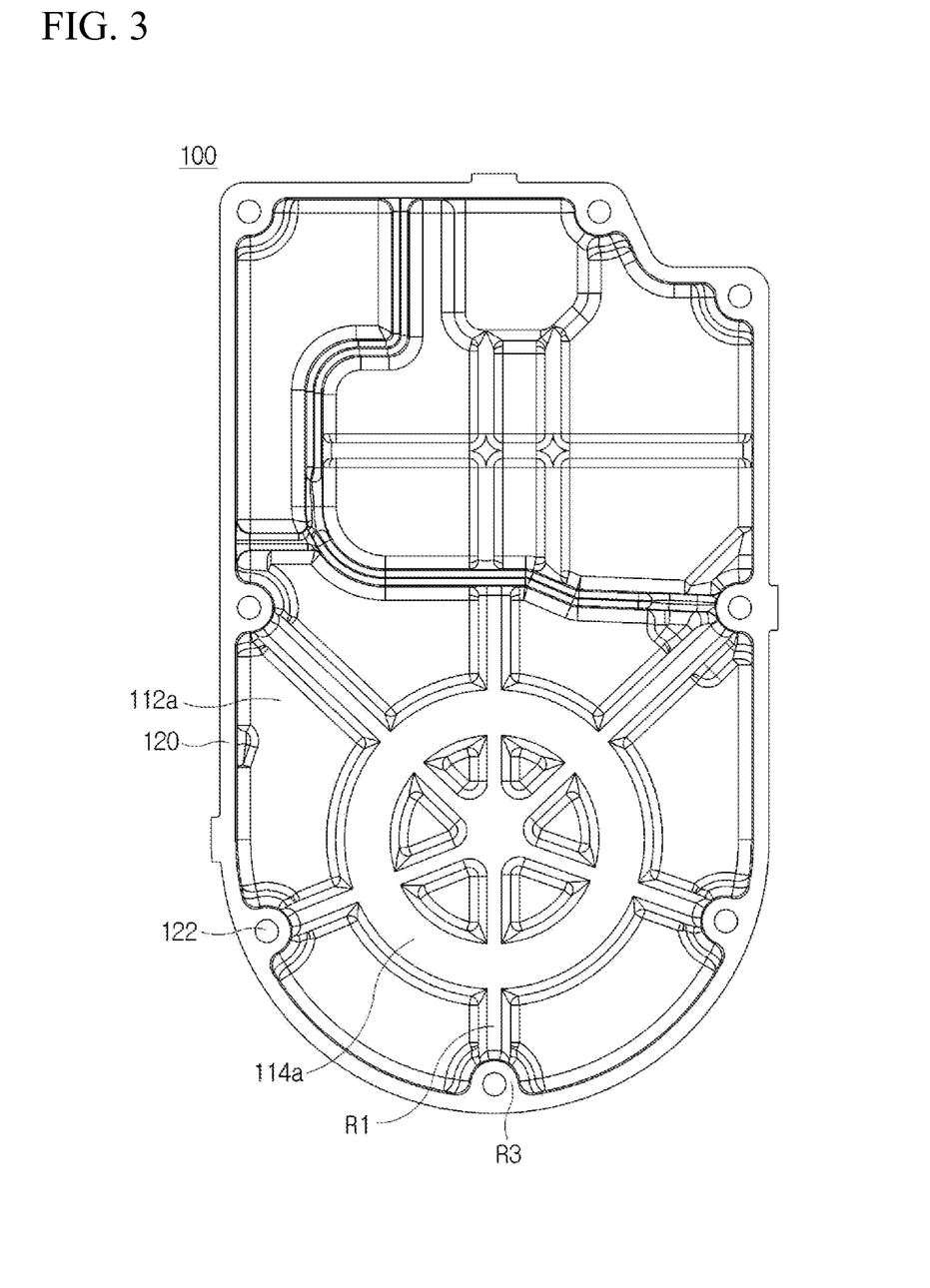
FIG. 3 is a front view of FIG. 2
Figure 4:
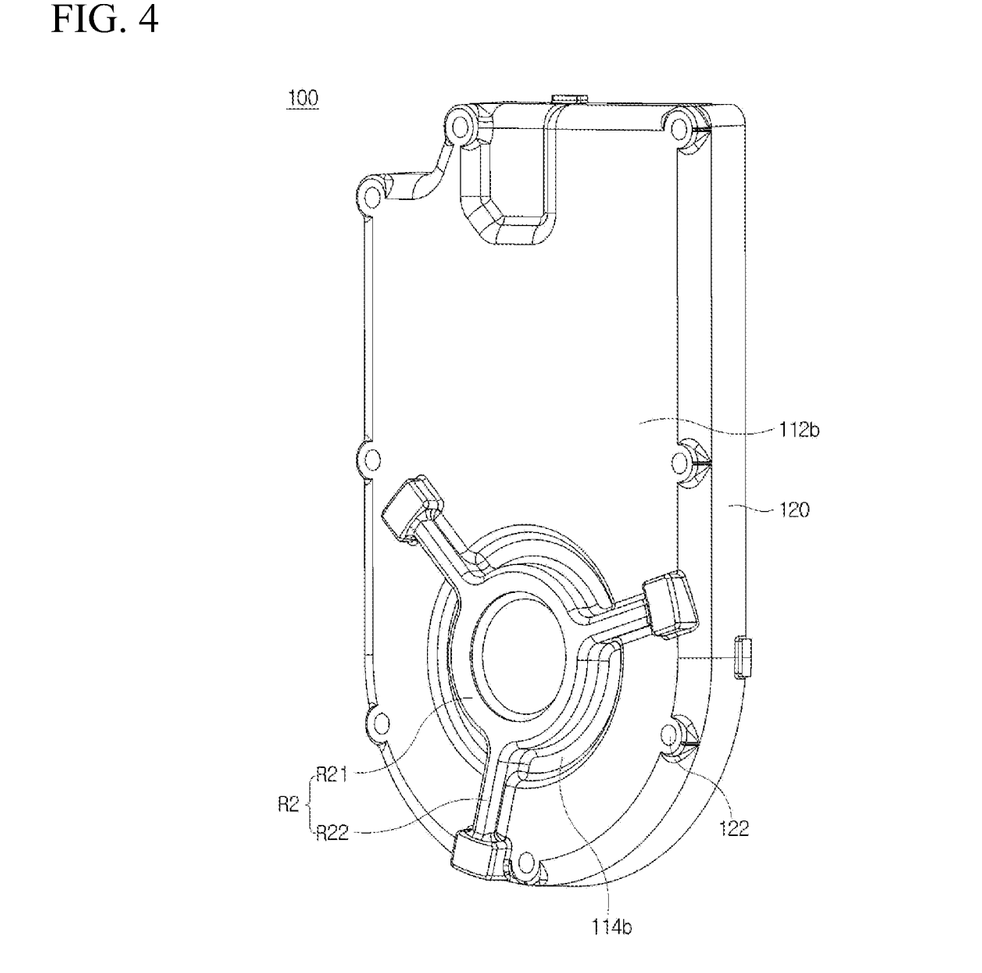
FIG. 4 is a perspective view illustrating a rear of FIG. 2.
Figure 5:
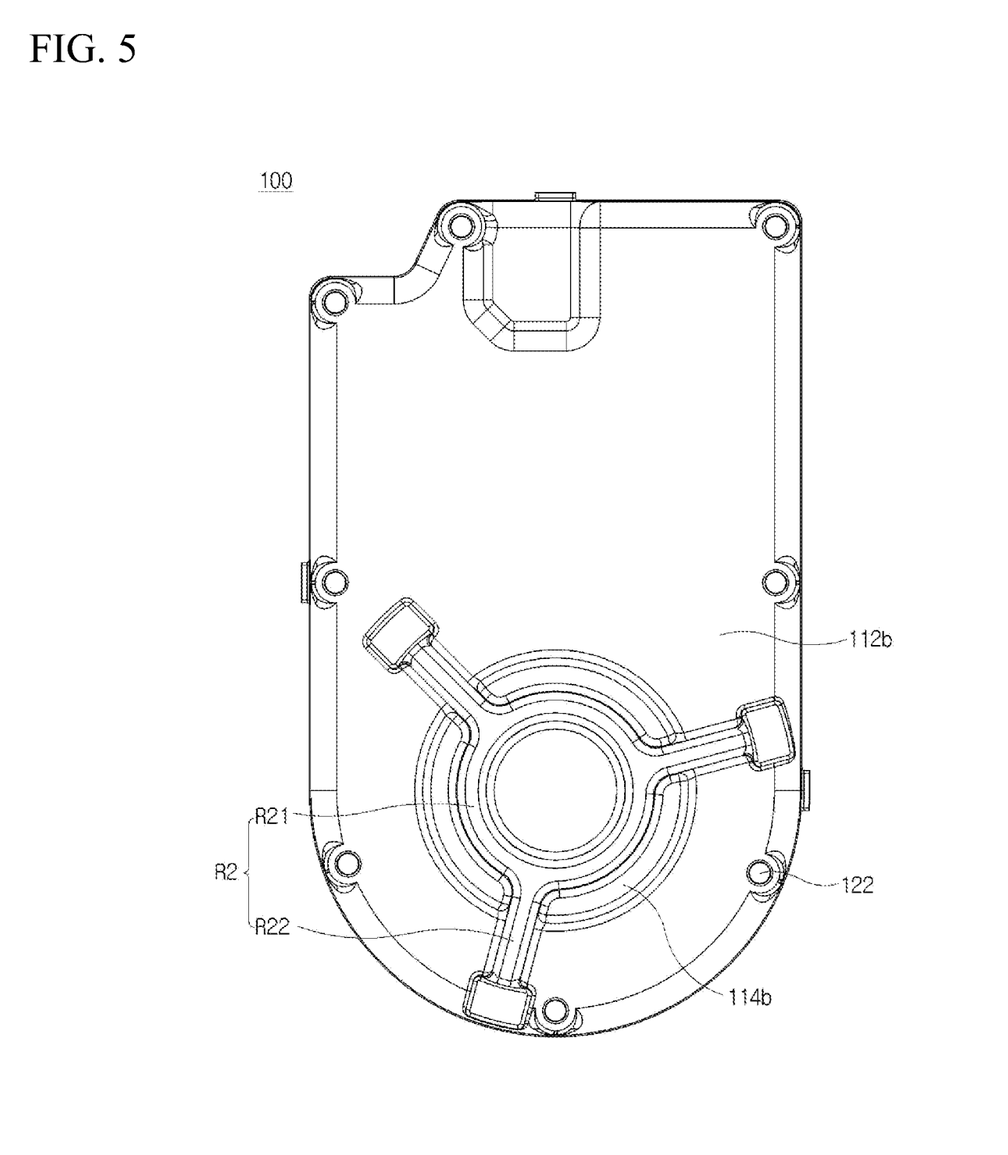
FIG. 5 is a front view of FIG. 4.
Figure 6:
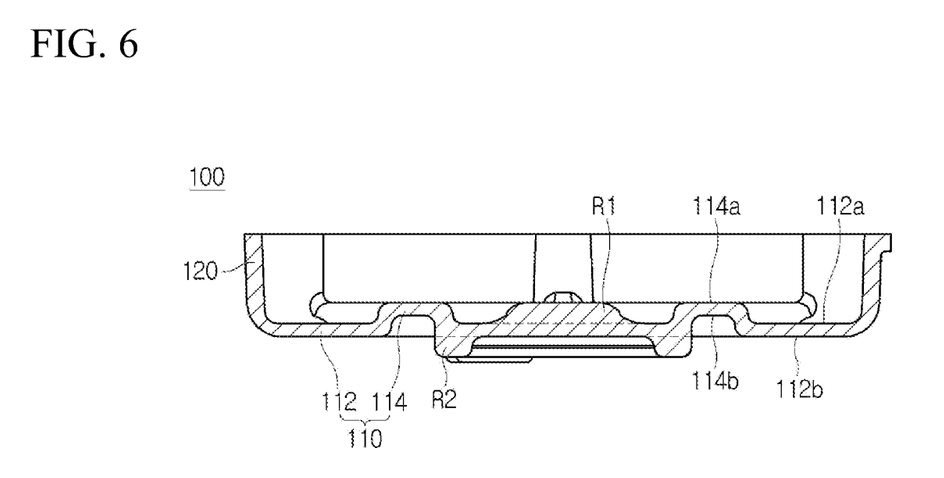
FIG. 6 is a cross sectional view taken along I-I' line of FIG. 2.

FIG. 2 is a perspective view illustrating an electric compressor according to an embodiment of the present disclosure, FIG. 3 is a front view of FIG. 2, FIG. 4 is a perspective view illustrating a rear of FIG. 2, FIG. 5 is a front view of FIG. 4, and FIG. 6 is a cross sectional view taken along I-I' line of FIG. 2.

Meanwhile, FIG. 7 is a comparison chart illustrating effects of the inverter cover of FIGS. 2 through 6 on the natural frequency, amplitude, and weight.

Referring to FIGS. 2 to 6, a compressor according to an embodiment of the present disclosure may include a casing, a compression mechanism (not illustrated) for compressing a refrigerant inside the casing, a motor (not illustrated) for providing power to the compression mechanism (not illustrated), and an inverter (not illustrated) for controlling the motor (not illustrated).

The casing may include a main housing (not illustrated) having a motor accommodation space for accommodating the motor (not illustrated) therein, a rear housing (not illustrated) coupled to one side of the main housing (not illustrated) and having a compression mechanism accommodation space in which the compression mechanism (not illustrated) is accommodated, the front housing (not illustrated) coupled to the other side of the main housing (not illustrated) and having an opening into which the inverter (not illustrated) is inserted, and an inverter cover 100 coupled to the front housing (not illustrated) and covering the opening of the front housing (not illustrated) to form, together with the front housing (not illustrated), an inverter accommodation space in which the inverter (not illustrated) is accommodated.

Here, the inverter cover 100 may include a plate-shaped plate 110 and an annular side plate 120 protruding from an outer circumference of the plate 110 toward the front housing (not illustrated) and extending along the outer circumference of the plate 110.

The plate 110 is formed of a flat and thin plate for weight and cost reduction. Accordingly, the rigidity of the plate 110 is weakened, so that damage to the plate 110 may easily occur, and vibration and noise characteristics may deteriorate.

In consideration of this, the plate 110 of the present embodiment may be formed to be curved to increase the rigidity of the plate 110.

Specifically, the plate 110 may include a first plate portion 112, and a second plate portion 114 extending from the first plate portion 112 and formed to protrude more on an inside where the inverter (not illustrated) is embedded than the first plate portion 112 and to be more recessed than the first plate portion 112 on an outside.

That is, the first plate portion 112 may include a first inner surface 112a opposite the inverter (not illustrated) and a first outer surface 112b forming a rear surface of the first inner surface 112a, and the second plate portion 114 may include a second inner surface 114a opposite the inverter (not illustrated) and a second outer surface 114b forming a rear surface of the second inner surface 114a. The second inner surface 114a may be formed to be disposed at the inverter side (not illustrated) (illustrated in an upper part of FIG. 6) with respect to the first inner surface 112a, and the second outer surface 114b may be formed to be disposed at the inverter side (not illustrated) (illustrated in an upper part of FIG. 6) with respect to the first outer surface 112b.

Here, the second plate portion 114 may be formed at a center portion of the plate 110 that is relatively weak in rigidity (in particular, a position facing the motor in an axial direction). That is, the second plate portion 114 may be formed at a site far from the side plate 120, more precisely, from a fastening hole 122 to be described later.

In addition, the second plate portion 114 may be formed in an annular shape extending in a circumferential direction of the plate 110.

Meanwhile, the plate 110 may further include a rib portion R protruding from at least one among the first inner surface 112a and the first outer surface 112b so as to further increase the rigidity of the plate 110.

In the present embodiment, the rib portion R may include a first rib portion R1 protruding from the first inner surface 112a, a second rib portion R2 protruding from the first outer surface 112b and a fastening rib portion R3 surrounding a fastening hole 122 to be described later.

The first rib portion R1 may be formed to extend across the second plate portion 114 in a radial direction.

In addition, the first rib portion R1 may consist of a plurality of first rib portions, and the plurality of the first rib portions R1 may be disposed radially along a circumferential direction of the second plate portion 114 to meet each other in one region, and a center of the second plate portion 114 may be located inside the one region.

Here, the fastening rib portion R3 may be formed in an equal number to the number of the plurality of the first rib portion R1, and the plurality of the first rib portion R1 may extend from the plurality of the fastening rib portions R3, respectively.

The second rib portion further includes a second annular rib portion R21 formed on an inner side of the second plate portion 114 and a second straight rib portion R22 radially extending across the second plate portion 114 to the second annular rib portion R21.

Here, the second straight rib portion R22 may consist of at least one straight rib portion, and at least part of the at least one second straight rib portion R22 may be formed not to overlap the plurality of the first rib portions R1 in an axial direction. In addition, the at least one second straight rib portion R22 may be formed in a different number from the number of the plurality of the first rib portions R1.

The side plate 120 may further include a fastening hole 122 into which a fastening member (not illustrated) for fastening the inverter cover 100 to the front housing (not illustrated) is inserted, the fastening hole 122 may consist of a plurality of fastening holes, and the plurality of the fastening holes 122 may be disposed along an extension direction of the site plate 120.

Here, the inverter cover 100 may form the inverter accommodation space together with the front housing (not illustrated), as the side plate 120 is fastened to the front housing (not illustrated), and the plate 110 covers an opening of the front housing (not illustrated).

The compression mechanism (not illustrated) may be formed as a scroll type that includes a fixed scroll and an orbiting scroll forming a compression chamber together with the fixed scroll, but is not limited thereto, and may be formed as a crank type, swash plate type, vane rotary type, and the like.

The motor (not illustrated) may include a stator fixed to an inside of the main housing (not illustrated) and a rotor located inside the stator and rotated by interaction with the stator, and the rotor may be connected to a compression mechanism (not illustrated) through a rotary shaft.

The inverter (not illustrated) may include various elements necessary for controlling the inverter and a substrate on which the elements are mounted.

Hereinafter, the operation and effects of the electric compressor according to the present embodiment will be described.

That is, when a power is applied to the motor (not illustrated), the rotary shaft may rotate together with the rotor and transmit a rotational force to the orbiting scroll. Then, the orbiting scroll is rotated by the rotary shaft such that a volume of the compression chamber can be reduced while continuously moving toward a center. Then, the refrigerant may be sucked into the compression chamber, compressed while moving toward the center along a moving path of the compression chamber, and then discharged.

In this process, since the motor (not illustrated) is controlled by the inverter (not illustrated), cooling efficiency may be variably controlled.

Here, in the electric compressor according to the present embodiment, as the plate 110 of the inverter cover 100 includes the rib portion R, a thickness of the plate 110 may be increased. That is, a plate thickness of a portion where the rib portion R is not formed is a thickness of the first plate portion 112 (a distance between the first inner surface 112a and the first outer surface 112b), whereas a plate thickness of a portion where the rib portion R is formed may be a sum of the thickness of the first plate portion 112 and a thickness of the rib portion R. (when the first rib portion R1 is formed, a distance between the first inner surface 112a and an end face of the first rib portion R1, when the second rib portion R2 is formed, a distance between the first outer surface 112b and an end face of the second rib portion R2, and when both the first rib portion R1 and the second rib portion R2 are formed, a distance between the end face of the first rib portion R1 and the end face of the second rib portion R2) Accordingly, the rigidity of the plate 110 is increased, damage to the plate 110 is suppressed, and the natural frequency of the plate 110 is increased so that vibration and noise characteristics can be improved beyond the resonant frequency range.

However, weight of the plate 110 may be also increased by the rib portion R, so the manufacturing cost of the inverter cover 100 may be increased, and weight and fuel efficiency of a vehicle in which the electric compressor is mounted may be deteriorated.

In consideration of this, in the electric compressor according to the present embodiment, the plate 110 of the inverter cover 100 may be formed to be curved. That is, the plate 110 may include the first plate portion 112, and the second plate portion 114 formed to be curved from the first plate portion 112.

Here, a plate thickness of a portion where the second plate portion 114 is formed may be the same as a thickness of the second plate portion 114 (a distance between the second inner surface 114a and the second outer surface 114b), and may be smaller than a sum of the thickness of the first plate portion 112 and the thickness of the rib portion R (the plate thickness of the portion where the rib portion R is formed). Preferably, the thickness of the second plate portion 114 may be formed at the equal level as the thickness of the first plate portion 112, so that the plate thickness of the portion where the second plate portion 114 is formed may be formed at the equal level as the thickness of the first plate portion 112.

Such a curved structure by the second plate portion 114 replaces at least part of the rib portion R, so that the rigidity of the plate 110 can be increased, damage to the plate 110 can be suppressed, and the natural frequency of the plate 110 can be increased to go beyond the resonant frequency range, and vibration and noise characteristics can be improved, without significantly increasing the weight of the plate 110.

That is, as shown in FIG. 7, the curved structure by the second plate portion 114 may achieve to increase rigidity of the inverter cover 100, reduce vibration and noise, and suppress a weight increase at the same time.

For reference, referring to the natural frequency, amplitude, and weight comparison data between an inverter cover of an embodiment of the related art and an inverter cover of another embodiment of the related art in FIG. 7 and looking at effects of adding only the rib portion, it can be confirmed through the amplitude that the natural frequency of the inverter cover is increased and goes beyond the resonant frequency range, but it can also be confirmed that the weight of the inverter cover is significantly increased.

On the other hand, referring to the natural frequency, amplitude, and weight comparison data between the inverter cover of another embodiment of the related art and the inverter cover 100 of the present embodiment in FIG. 7 and looking at effects of replacing the rib portion with the second plate portion 114, it can be confirmed that the natural frequency of the inverter cover becomes equal or higher, the amplitude becomes equal or lower, and the weight of the inverter cover is significantly reduced. That is, it can be confirmed that an amount of weight increase relative to a degree of deviation from the resonant frequency range when the second plate portion 114 is applied to the inverter cover is greater than an amount of weight increase relative to a degree of deviation from the resonant frequency range when the rib portion is applied.

Meanwhile, in the case of the present embodiment, the second inner surface 114a is formed to be disposed at the inverter (not illustrated) side with respect to the first inner surface 112a, and the second outer surface 114b is formed to be disposed at the inverter (not illustrated) side with respect to the first outer surface 112b, accordingly, the second plate portion 114 is formed to be recessed toward the inverter (not illustrated) side. However, the present disclosure is not limited thereto. That is, the second inner surface 114a may be formed to be disposed on at opposite side of the inverter (not illustrated) with respect to the first inner surface 112a, and the second outer surface 114b may be formed to be disposed at an opposite side of the inverter (not illustrated) with respect to the first outer surface 112b, so that the second plate portion 114 can be formed to be recessed toward the opposite side of the inverter (not illustrated).

In the meantime, in the case of the present disclosure, although minimized, the rib portion R is formed. That is, the plate 110 includes the rib portion R, as well as the first plate portion 112, and the second plate portion 114. However, the present disclosure is not limited thereto. That is, the plate 110 may include the first plate portion 112 and the second plate portion 114, and may not include the rib portion R.

Meanwhile, in the case of the present disclosure, the second plate portion 114 may be formed in an annular shape extending in a circumferential direction of the plate 110. However, the present disclosure is not limited thereto. That is, the second plate portion 114 may be formed in a circular shape, a lattice shape, a diamond shape, and the like.

What is claimed is:

1. An electric compressor comprising:
   a casing;
   a compression mechanism for compressing a refrigerant inside the casing;
   a motor for providing power to the compression mechanism; and
   an inverter for controlling the motor, wherein the casing further comprises an inverter cover for sealing the inverter from an outside, wherein the inverter cover further comprises a plate-shaped plate, and wherein the plate further comprises:
      a first plate portion; and
      a second plate portion extending from the first plate portion and protruding toward an inside in which the inverter is embedded,
   wherein the first plate portion further comprises:
      a first inner surface facing the inside; and
      a first outer surface forming a rear surface of the first inner surface and facing the outside,
   wherein the second plate portion further comprises:
      a second inner surface facing the inside; and
      a second outer surface forming a rear surface of the second inner surface and facing the outside, wherein the second inner surface is formed to be disposed on the inside with respect to the first inner surface, and wherein the second outer surface is formed to be disposed on the inside with respect to the first outer surface, wherein the plate further comprises a first rib portion protruding from the first inner surface and a second rib portion protruding from the first outer surface, wherein a thickness of the second plate portion is formed smaller than a sum of a thickness of the first plate portion and a thickness of the second rib portion, wherein the second rib portion further comprises a second annular rib portion formed on an inner side of the second plate portion.

2. The electric compressor of claim 1, wherein the second plate portion is formed to protrude more than the first plate portion on the inside and to be more recessed than the first plate portion on the outside.

3. The electric compressor of claim 1, wherein the thickness of the second plate portion is formed smaller than a sum of the thickness of the first plate portion and a thickness of the first rib portion.

4. The electric compressor of claim 3, wherein the second plate portion is formed in an annular shape, and wherein the first rib portion extends across the second plate portion in a radial direction.

5. The electric compressor of claim 4, wherein the first rib portion consists of a plurality of first rib portions, wherein the plurality of first rib portions are radially disposed in a circumferential direction of the second plate portion to meet each other in one region, and wherein a center of the second plate portion is located inside the one region.

6. The electric compressor of claim 5, wherein the inverter cover further comprises a fastening hole to which a fastening member is inserted, and a fastening rib portion surrounding the fastening hole, wherein the fastening hole and the fastening rib portion consist of a plurality of fastening holes and a plurality of fastening rib portions, respectively, and wherein the plurality of first rib portions extends from the plurality of fastening rib portions, respectively.

7. The electric compressor of claim 1, wherein the second rib portion further comprises a straight rib portion radially extending across the second plate portion to the second annular rib portion.

8. The electric compressor of claim 7, wherein the first rib portion consists of a plurality of first rib portions, wherein the straight rib portion consists of at least one straight rib portion, and at least part of the at least one straight rib portion is formed not to overlap the plurality of first rib portions in an axial direction.

9. The electric compressor of claim 8, wherein the at least one straight rib portion is formed in a different number from the plurality of first rib portions.

10. The electric compressor of claim 1, wherein the thickness of the second plate portion is formed at an equal level to the thickness of the first plate portion.

11. The electric compressor of claim 1, wherein the inverter cover further comprises a side plate formed on an outer circumference of the plate, and wherein the second plate portion is formed in a center of the plate.

12. The electric compressor of claim 11, wherein the second plate portion is formed at a position facing the motor in an axial direction.

13. An electric compressor comprising:

a casing;

a compression mechanism for compressing a refrigerant inside the casing;

a motor for providing power to the compression mechanism; and an inverter for controlling the motor, wherein the casing further comprises an inverter cover for sealing the inverter from an outside, wherein the inverter cover further comprises a plate-shaped plate, and wherein the plate further comprises:

a first plate portion; and a second plate portion extending from the first plate portion and protruding toward an inside in which the inverter is embedded, wherein the first plate portion further comprises:

a first inner surface facing the inside; and a first outer surface forming a rear surface of the first inner surface and facing the outside, wherein the second plate portion further comprises:

a second inner surface facing the inside; and a second outer surface forming a rear surface of the second inner surface and facing the outside, wherein the second inner surface is formed to be disposed on the inside with respect to the first inner surface, and wherein the second outer surface is formed to be disposed on the inside with respect to the first outer surface, wherein the plate further comprises:

a first rib portion protruding from the first inner surface; and     a second rib portion protruding from the first outer surface, and wherein the second rib portion comprises:

a second annular rib portion formed on an inner side of the second plate portion; and     a straight rib portion radially extending across the second plate portion to the second annular rib portion.

\* \* \* \* \*